US007558866B2

(12) United States Patent
Choe et al.

(10) Patent No.: US 7,558,866 B2
(45) Date of Patent: Jul. 7, 2009

(54) METHOD AND SYSTEM FOR SECURELY PROVISIONING A CLIENT DEVICE

(75) Inventors: Calvin C. Choe, Redmond, WA (US); Vivek P. Kamath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 11/007,122

(22) Filed: Dec. 8, 2004

(65) Prior Publication Data

US 2006/0123118 A1    Jun. 8, 2006

(51) Int. Cl.
*G06F 15/16* (2006.01)
(52) U.S. Cl. .................. 709/229; 709/223; 709/226; 709/227; 709/245; 726/4; 726/5; 726/17; 726/18; 726/21
(58) Field of Classification Search .......... 709/223, 709/226, 227, 229, 245; 726/4, 5, 17, 18, 726/21
See application file for complete search history.

(56) References Cited

U.S. PATENT DOCUMENTS

| | | | |
|---|---|---|---|
| 6,393,484 B1 * | 5/2002 | Massarani | 709/227 |
| 6,412,025 B1 | 6/2002 | Cheston et al. | |
| 6,618,757 B1 * | 9/2003 | Babbitt et al. | 709/226 |
| 6,643,694 B1 * | 11/2003 | Chernin | 709/223 |
| 6,684,243 B1 | 1/2004 | Euget et al. | |
| 6,728,718 B2 | 4/2004 | Banerjee et al. | |
| 6,792,474 B1 * | 9/2004 | Hopprich et al. | 709/245 |
| 7,065,578 B2 * | 6/2006 | Garrett et al. | 709/229 |

OTHER PUBLICATIONS

Partial European Search Report from corresponding European Application No. 05111673.9.
Gudmund Sson, O., Trusted Information Systems: *Security Architecture for DHCP*, IETF Standard-Working-Draft, Internet Engineering Task Force, IETF, CH, vol. dhc, No. 1, Jul. 30, 1997, pp. 11-14; XP015017184 ISSN: 0000-0004.
Jayaraman, P., et al. *PANA Framework*; IETF Standard-Working-Draft, Internet Engineering Task Force, IETF, CH, vol. pana, No. 1, Jul. 16, 2004, pp. 0-46, XP015024807 ISSN:0000-0004.
Droms, R., *Automated Configuration of TCP/IP With DHCP*, IEEE Internet Computing, IEEE Service Center, New York, vol. 3, No. 4, 1999, pp. 45-53 XP000874503 ISSN: 1089-7801.

(Continued)

*Primary Examiner*—Jinsong Hu
(74) *Attorney, Agent, or Firm*—Wolf, Greenfield & Sacks, P.C.

(57) ABSTRACT

Disclosed is a mechanism for securely provisioning a client by authenticating that client during a dynamic configuration process. Rather than relying on post-configuration authentication schemes, the present invention combines security and dynamic configuration into a unified scheme. Any client device attempting to access a network may request configuration information from a configuration server associated with that network, but the server does not comply with the request until the client has successfully authenticated itself as a device authorized to receive configuration information for the network. The configuration server may provide the client with temporary configuration information that allows the client to proceed with the authentication process but that denies the client full access to the network. Upon successful authentication, the server may give the client new, non-temporary configuration information or may change the status of the information already given from temporary to a status giving fuller access.

12 Claims, 8 Drawing Sheets

OTHER PUBLICATIONS

European Search Report from corresponding European Application No. 05111673.

Droms, R., *Dynamic Host Configuration Protocol*, IETF RFC 2131, Mar. 1997.

Aboba et al., *Extensible Authentication Protocol (EAP)*, IETF RFC 3748, Jun. 2004.

* cited by examiner

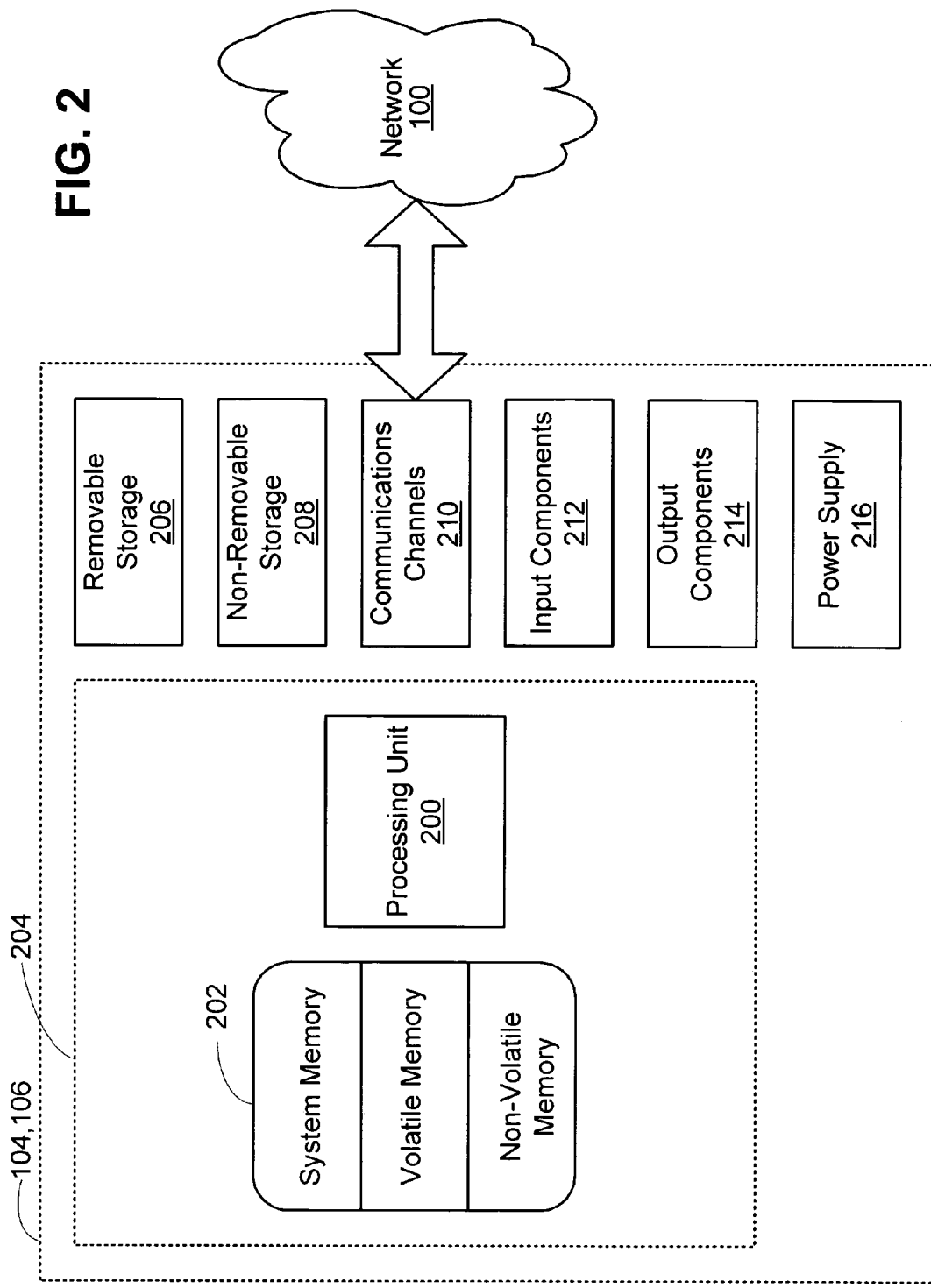

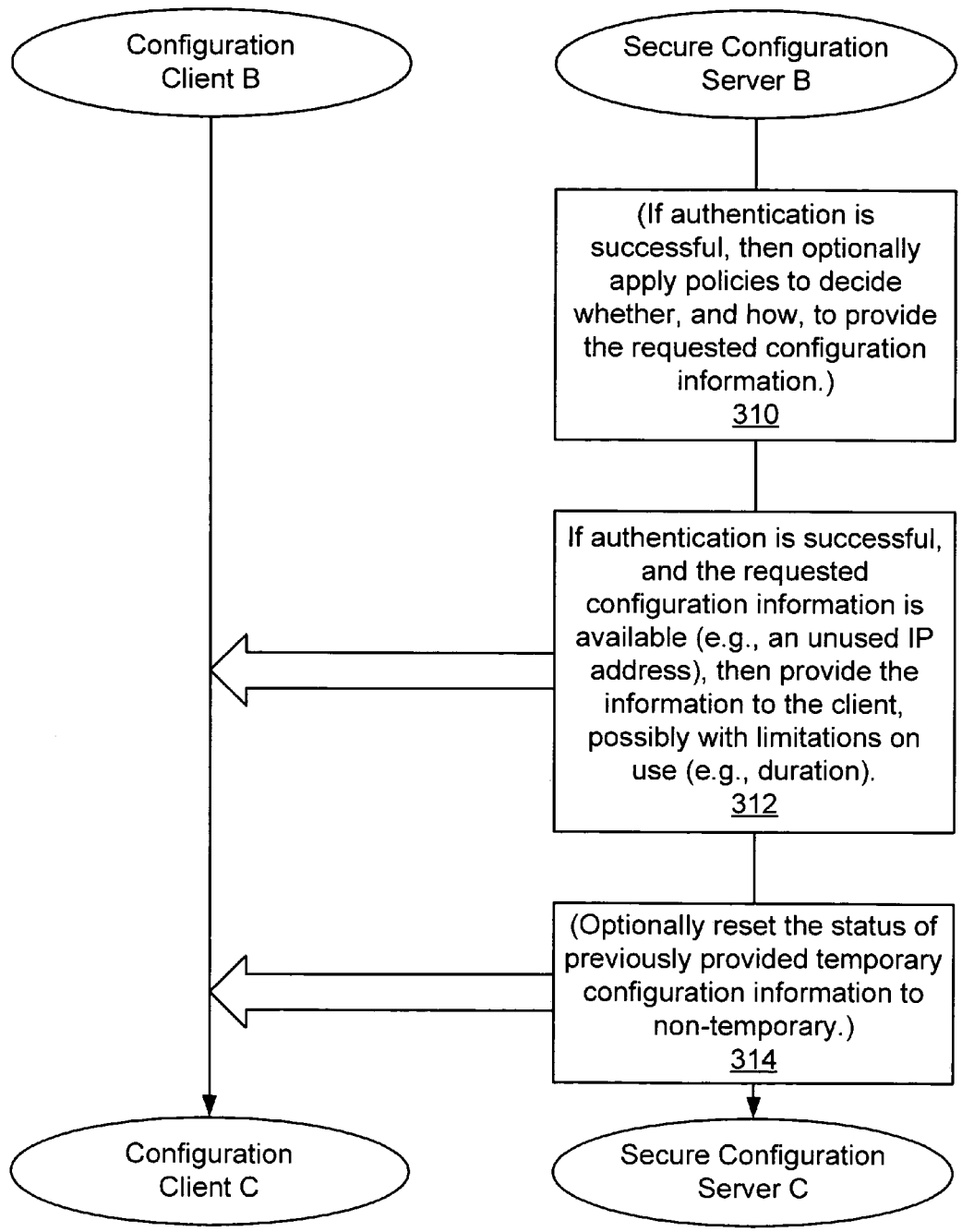

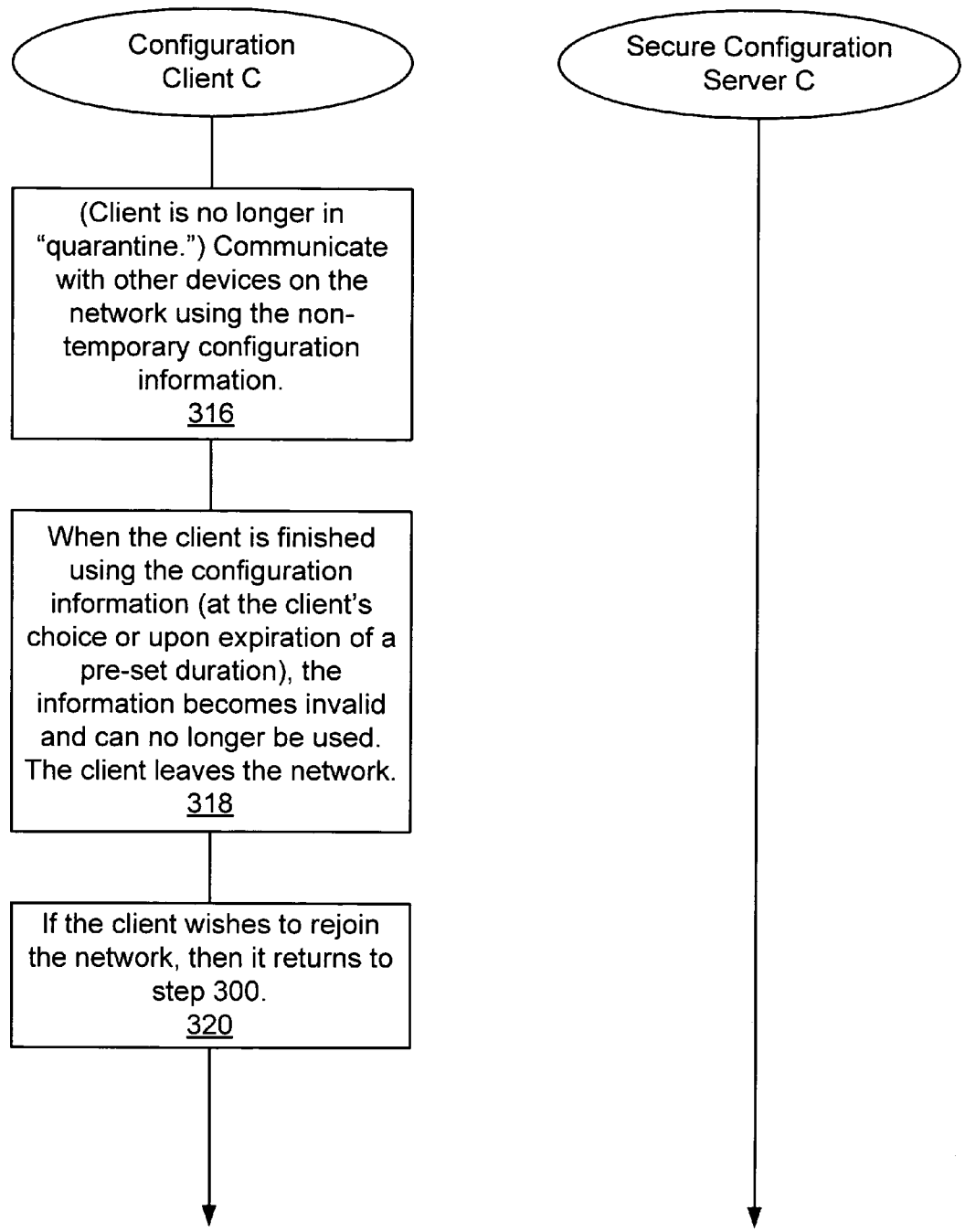

METHOD AND SYSTEM FOR SECURELY PROVISIONING A CLIENT DEVICE

TECHNICAL FIELD

The present invention is related generally to computer communications, and, more particularly, to remotely provisioning a client device.

BACKGROUND OF THE INVENTION

In the past, once a computer was configured for its working environment, that configuration rarely or never changed. In today's dynamic computing environment, however, a computer may need to change its configuration frequently. When, for example, a mobile computer moves from one wireless network to another, it might change its network address to one compatible with the new network. Also, when a computer temporarily joins an ad hoc networking group, administrative and security policies may require the computer to change its configuration to one more acceptable to the ad hoc group. In a third example, some computers change their configuration, at least their network address, every time they access the Internet through an Internet Service Provider (ISP).

Protocols have been developed to support various aspects of dynamic configuration. As one example, DHCP, the Dynamic Host Configuration Protocol, provides, among other network configuration information, an IP (Internet Protocol) address to a requesting computer. DHCP uses a client-server model, where a client computer, needing an IP address, requests one of a DHCP server. The DHCP server, in some cases provided by an ISP, controls a pool of IP addresses. Upon receiving the client's request, the DHCP server performs one of three modes of address allocation. In the "automatic allocation" mode, the DHCP server chooses an unused IP address from its pool and permanently assigns it to the requesting client. In the "manual allocation" mode, a network administrator chooses the address. Most interestingly for dynamic configuration, in the "dynamic allocation" mode, the DHCP server assigns a currently unused IP address to the client, but this dynamic address is valid only for a limited period of time as set by the DHCP server or until the client explicitly gives up its use of the address. Regardless of the allocation mode used, the DHCP server responds to the client's request by informing the client of the IP address assigned to it along with, in the case of dynamic allocation, the time period of the assignment. If the DHCP server cannot provide an IP address (possibly because all of the addresses in its pool are currently in use), then the DHCP server informs the client of this fact, and the client must wait until later to access the network.

In any dynamic computing system, ease of configuration should be balanced against security concerns. Many an institution establishes a dynamic network to perform the internal (that is to say, the private) work of the institution, and the institution can be compromised if an unauthorized computer is allowed to dynamically configure itself and join the network. Useful as they are, dynamic configuration protocols, including DHCP, are in general weak in the area of security. By relying heavily on post-configuration processes (such as encryption-key-based authentication mechanisms) to secure their network, some configuration servers inadvertently allow in rogue clients. While the post-configuration schemes usually work as advertised to limit the access and the possible harm of rogue clients, still, some harm can be done by a rogue even before it is forced to submit to, and to presumably fail, a post-configuration protection scheme.

SUMMARY OF THE INVENTION

In view of the foregoing, the present invention provides a mechanism for securely provisioning a client by authenticating that client during a dynamic configuration process. Rather than relying on post-configuration authentication schemes, the present invention combines security and dynamic configuration into a unified scheme.

Any client device attempting to access a network may request configuration information from a configuration server associated with that network, but the server does not comply with the request until the client has successfully authenticated itself as a device authorized to receive configuration information for the network. In one embodiment, the configuration server may provide the client with temporary configuration information, e.g., a temporary network address, that allows the client to proceed with the authentication process but that denies the client full access to the network. Upon successful authentication, the server may give the client new, non-temporary configuration information or may change the status of the information already given from temporary to a status giving fuller access.

In one embodiment, the present invention uses an existing dynamic configuration protocol, such as DHCP, without the need for changing that protocol. Messages used in the authentication process are carried within existing configuration messages, for example within the options field in DHCP messages.

In another embodiment, the present invention applies existing security protocols to a dynamic configuration environment. The Extensible Authentication Protocol (EAP), for example, can be used without modification as an authentication framework for many of the security tasks of the present invention.

Combining the embodiments of the previous two paragraphs, EAP messages can be carried in the options field of DHCP messages. When a client requests configuration information, it includes within its DHCP message an EAP capability option. EAP is pursued until the client has authenticated itself to the DHCP server (and, in some scenarios, the server has authenticated itself to the client). At that point, the DHCP server can respond to the initial request by providing the requested configuration information.

As part of a secured, dynamic provisioning mechanism, a configuration server can apply policies set up for the network it is serving. For example, the configuration information provided can be limited in duration or in scope.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2 is a schematic diagram generally illustrating an exemplary computing device that supports the present invention;

FIGS. 3a through 3c together are a logic flow diagram showing an exemplary exchange between a client and a secure configuration server;

DETAILED DESCRIPTION OF THE INVENTION

Figure 1:
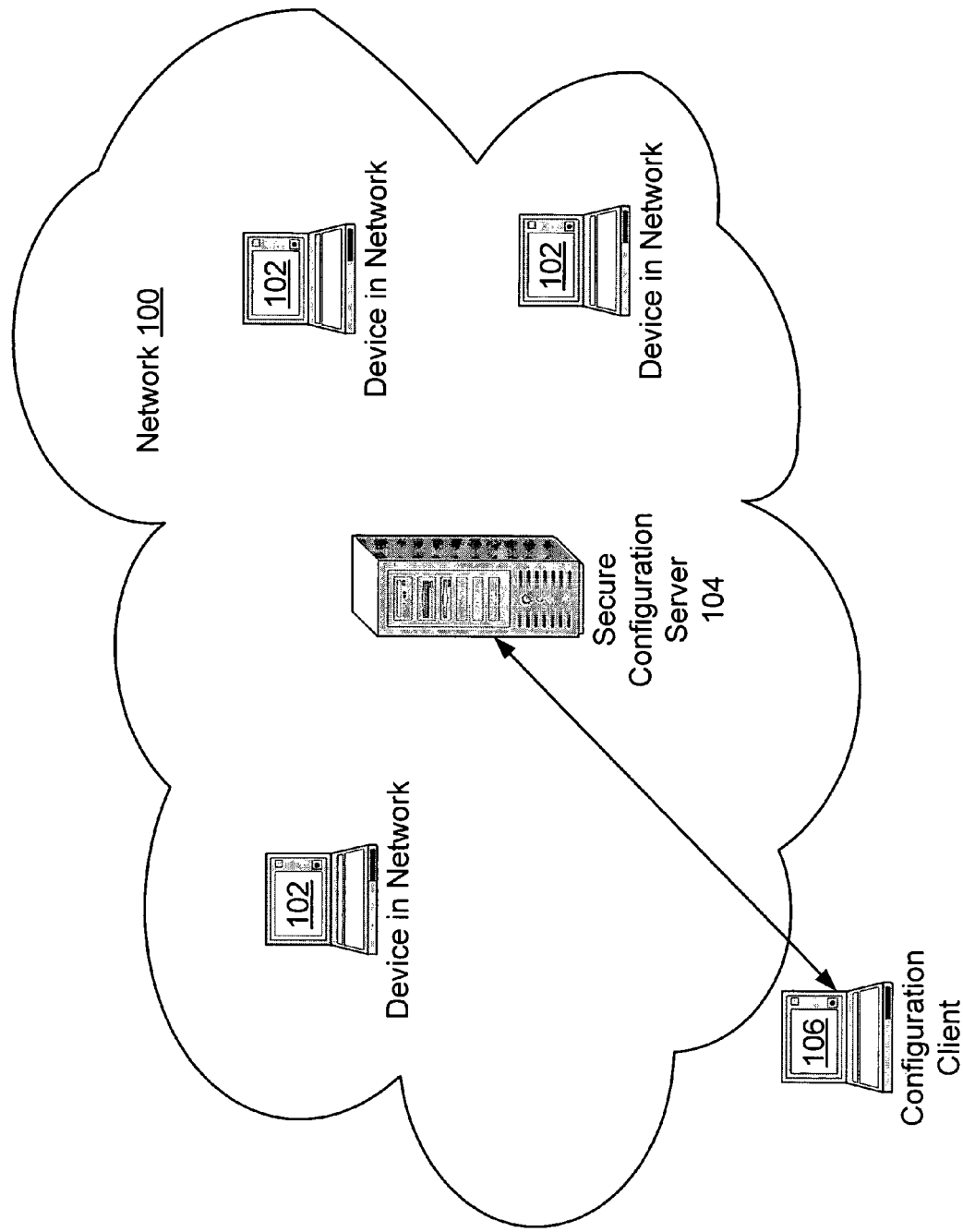
FIG. 1 is a block diagram showing a client device attempting to join a network that is "guarded" by a secure configuration server.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the environment surrounding the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

FIG. 1 is useful for presenting an overview of various aspects of the present invention. A more detailed discussion follows with reference to the other figures. A secured network 100 is shown in FIG. 1. Here, secured simply means that the network 100 is closed to non-authorized users. Security is enforced by a set of configuration parameters: Devices 102 already in the network 100 have the proper configuration parameters and may thus freely communicate with one another. An outsider like the configuration client 106 does not have a proper set of configuration parameters and therefore cannot communicate with these devices 102. Because the configuration client 106 wishes to join the network 100, it seeks admission through the secure configuration server 104 that is "guarding" the network 100. As a gateway to the network 100, any outside device can freely communicate with the secure configuration server 104.

Upon receiving the configuration client 106's request to join the network 100, but before providing the configuration client 106 with a proper set of configuration parameters, the secure configuration server 104 forces the configuration client 106 to authenticate itself, that is, to prove that it is a device authorized to join the network 100. How that authorization is initially set up is beyond the scope of the present discussion, but numerous methods are well known in the art.

The configuration client 106 proceeds to prove its identity to the secure configuration server 104. Detailed examples of this authentication process accompany FIGS. 3a through 3c, 4a, 4b, and 5. In some networks, the secure configuration server also proves its identity to the requesting configuration client. This two-way, or mutual, authentication enhances the security of these networks by preventing a rogue device from impersonating the network's secure configuration server.

If the authentication process completes successfully, then the secure configuration server 104 knows that the configuration client 106 is authorized to join the network 100. The secure configuration server 104 then provides an appropriate set of configuration parameters to the configuration client 106, and the configuration client 106 uses those parameters to join the network 100 and to freely communicate with the other devices 102 already in the network 100.

Eventually, the configuration client 106 leaves the network 100. This may be at the discretion of the configuration client 106, or the set of configuration parameters provided to it may expire. In any case, those configuration parameters are no longer valid, and whenever the configuration client 106 wishes to rejoin the network 100, it repeats the above process.

The scenario of FIG. 1 is intentionally simplified in order to focus on relevant aspects of the present invention. The secure configuration server 104 of FIG. 1 may in some networks actually be a configuration server working with a separate security server. Also, the secure configuration server 104 (of whatever description) may not actually reside within the network 100: A relay agent sitting in the network 100 may transfer configuration and authentication messages to a secure configuration server located remotely. Relay agents eliminate the necessity of having a secure configuration server on every secure network segment.

The configuration client 106 and the secure configuration server 104 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the client 106 nor the secure configuration server 104 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In their most basic configurations, the client 106 and the secure configuration server 104 typically include at least one processing unit 200 and memory 202. The memory 202 may be volatile (such as RAM), non-volatile (such as ROM or flash memory), or some combination of the two. This most basic configuration is illustrated in FIG. 2 by the dashed line 204. The client 106 and the secure configuration server 104 may have additional features and functionality. For example, they may include additional storage (removable and non-removable) including, but not limited to, magnetic and optical disks and tape. Such additional storage is illustrated in FIG. 2 by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other device that can be used to store the desired information and that can be accessed by the client 106 or by the secure configuration server 104. Any such computer-storage media may be part of the client 106 or of the secure configuration server 104. The client 106 and the secure configuration server 104 may also contain communications channels 210 that allow them to communicate with other devices, including devices on a network 100. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The client 106 and the secure configuration server 104 may also have input devices 212 such as a touch-sensitive display screen, a hardware keyboard, a mouse, a voice-input device, etc. Output devices 214 include the devices themselves, such as the touch-sensitive display screen, speakers, and a printer, and rendering modules (often called "adapters") for driving these devices. All these devices are well know in the art and need not be discussed at length here. The client 106 and the secure configuration server 104 each has a power supply 216.

Going deeper than the overview of FIG. 1, FIGS. 3a through 3c provide details of exemplary secure configuration schemes according to the present invention. For illustrative purposes, the logic flow diagram of these figures includes options and variations that might not apply in a given embodiment. In particular, the steps in the figures represent logical tasks and do not necessarily correspond one-to-one with individual messages. More specific details of a particular embodiment, including message exchanges and message formats, is discussed in relation to FIGS. 4a, 4b, and 5.

Figure 3A:
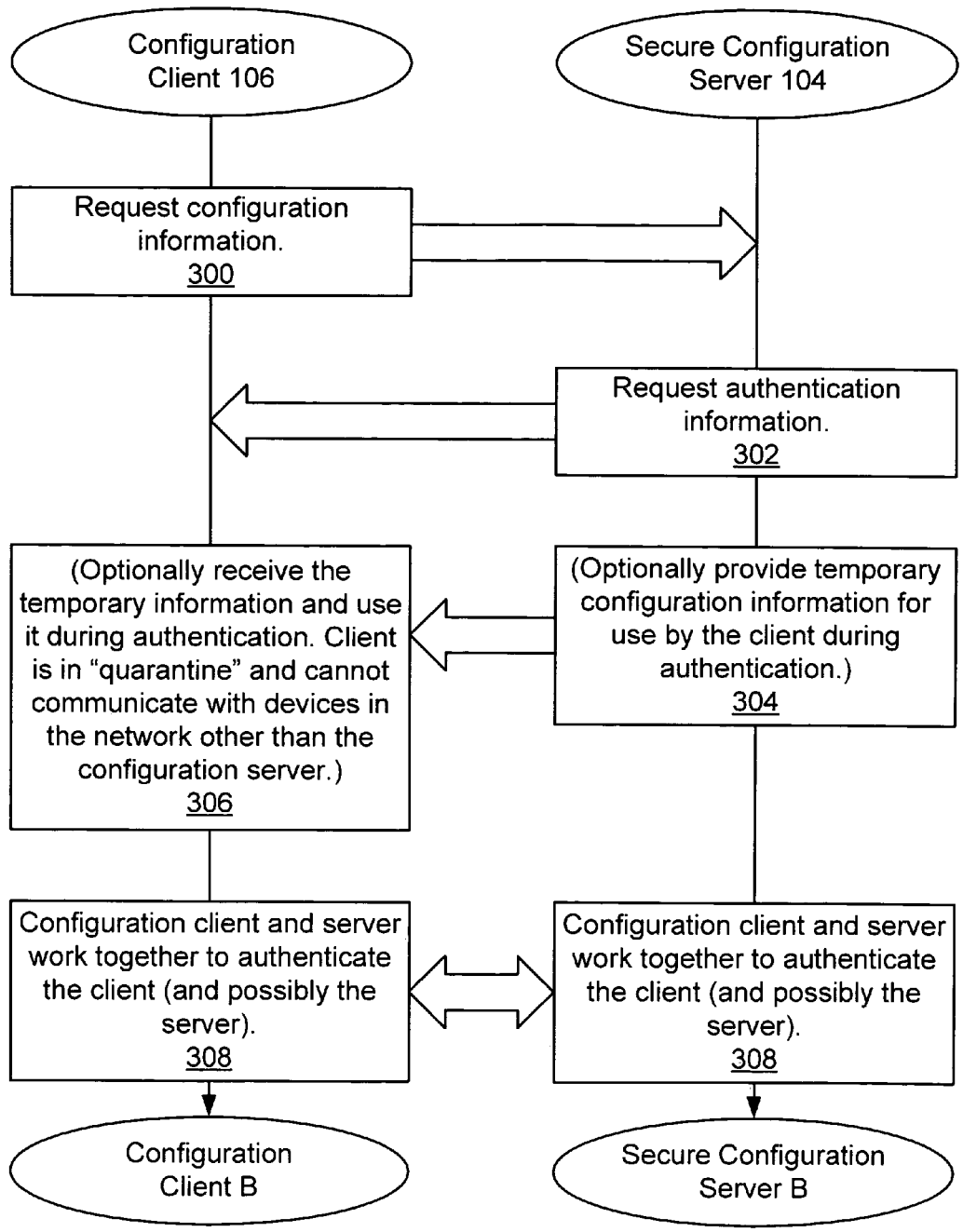

The logic of FIG. 3a begins in step 300 when the configuration client 106 requests from the secure configuration server 104 a set of configuration parameters that are valid for use on the network 100. Rather than immediately complying with the request, the secure configuration server 104 in step 302 asks the configuration client 106 to authenticate itself. In some embodiments (see specifically step 400 of FIG. 4a), the configuration client 106 does not wait for the secure configuration server 104 to request authentication; instead, the configuration client 106 begins the authentication process concurrently with its initial configuration request.

There are some network configurations in which the configuration client 106 needs to use a valid set of configuration parameters in order to continue communicating with the secure configuration server 104. This is somewhat of a Catch-22: For security reasons, the secure configuration server 104 does not want to provide valid configuration information to the configuration client 106 until the client 106 has authenticated itself as a device authorized to receive such information, but the authentication procedure cannot proceed until the client 106 has a set of valid parameters. Steps 304 and 306 present one way out of this dilemma, for some embodiments of the present invention. In step 304, the secure configuration server 104 provides a valid set of configuration parameters to the configuration client 106 so that the client 106 can continue the authentication process. However, the provided configuration information, while valid, is "temporary" and is only useful during authentication. For example, the configuration information can include an IP address that marks the user of the address as not fully authenticated. In step 306, the configuration client 106 receives the temporary configuration information and will use it during the remainder of the authentication process. In some instances, the temporary configuration information prevents the configuration client 106 from conversing with any device in the network 100 other than the secure configuration server 104: The configuration client 106 is said to be in "quarantine."

In step 308, the configuration client 106 and the secure configuration server 104 proceed through the authentication process. Many such authentication processes are well known in the art, and any of them can be used here. In some embodiments, the particular authentication process to be used is negotiated between the configuration client 106 and the secure configuration server 104. As mentioned above in relation to FIG. 1, the authentication process may be mutual with the configuration client 106 and the secure configuration server 104 each authenticating itself to the other.

If the authentication process fails, then, of course, the configuration client 106 is denied access to the network 100. If the configuration client 106 received temporary configuration information in step 306, the network 100 is still secure because of the limited use to which that information can be put. If the authentication process succeeds, then in step 310 of FIG. 3b the secure configuration server 104 applies policies in place in the network 100, if any, to decide how to provide the requested configuration information. These policies may, for example, limit the duration or scope of use of the configuration information (e.g., that information is only valid for a one-hour "lease").

If possible, then in step 312 the secure configuration server 104 provides the requested configuration information to the configuration client 106, along with information on any limitations on use set by policy in step 310. Of course, if the network 100 has exhausted the resources needed to fulfill the request (e.g., all of the assignable IP addresses are already in use), then the configuration process fails even though the authentication process succeeded. In some embodiments, resource availability is checked before proceeding through the authentication process, and the secure configuration server 104 can deny the configuration request on that basis instead of beginning the authentication process in step 302. However, this is not preferred because it provides confidential information (that the network 100 is low on resources) to a configuration client 106 that has not been authenticated and that might be able to use the information to the detriment of the network 100.

Step 314 notes that if the configuration client 106 was provided with temporary configuration information in step 304, then, in some embodiments, the secure configuration server 104 may choose to simply change the status of that information to non-temporary rather than sending a new set of configuration parameters. The effect is the same in either case.

With authentication complete and with the non-temporary configuration information in hand, the configuration client 106 is now a device on the network 100 and, in step 316 of FIG. 3c, can communicate with the other devices 102 (subject to whatever policy limitations were imposed on the provided configuration information). This continues until step 318 where the configuration client 106 either chooses to relinquish the provided configuration information, or a lease on the information expires. In the later case, the secure configuration server 104 marks the provided configuration information as invalid. In either case, the client 106 exits the network 100 and, if it wishes to continue communicating, repeats the secure configuration process (step 320).

The discussion accompanying FIGS. 3a through 3c is kept at a high level to illustrate the breadth of application of the present invention (which is, however, ultimately defined by the scope of the claims and not by any illustrations in this specification). To further the discussion, FIGS. 4a and 4b present a specific embodiment of the invention.

Figure 4A:
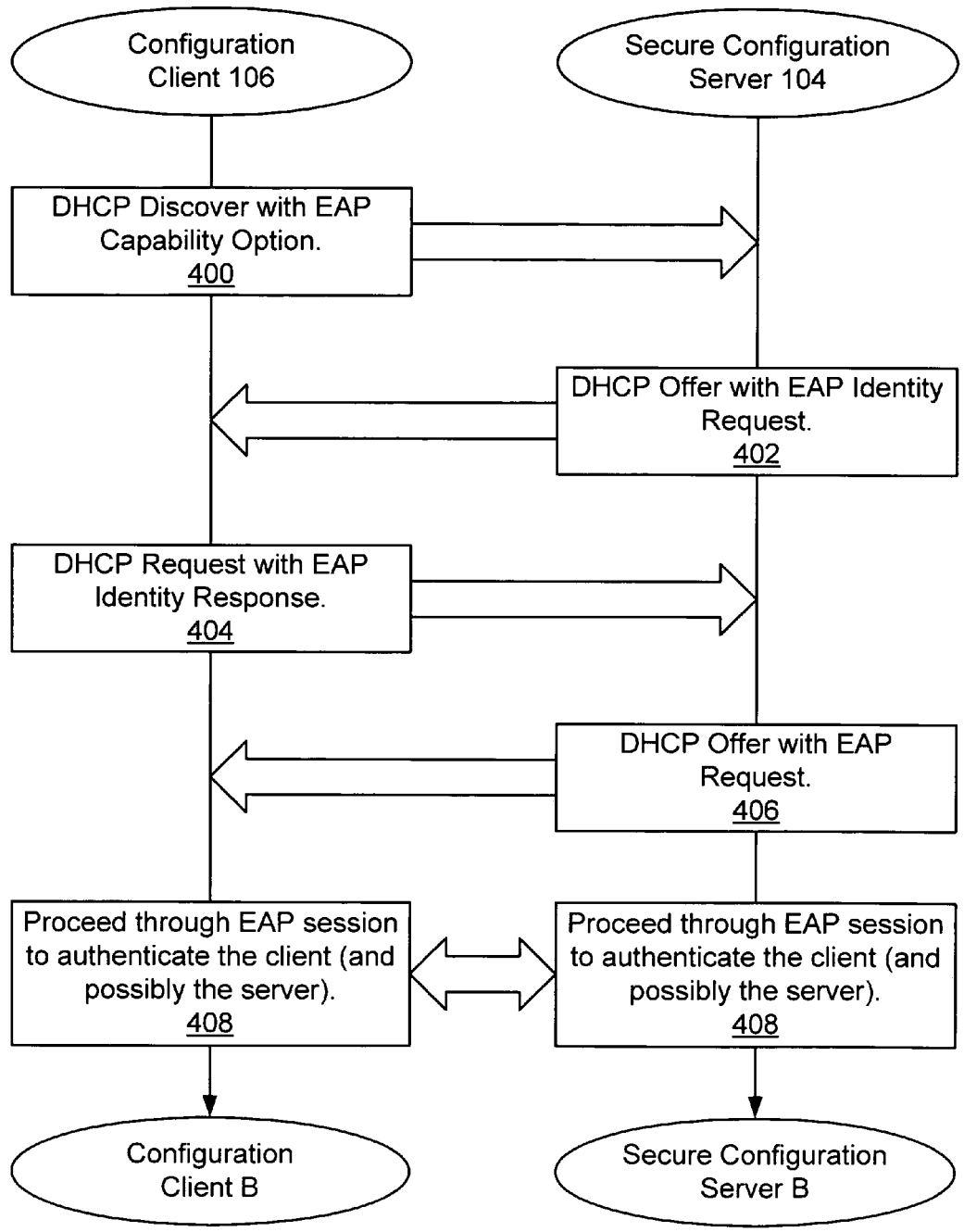
FIGS. 4a and 4b together are a communications flow diagram showing how DHCP and EAP messages can be used to implement a secure configuration scheme.
Figure 4B:
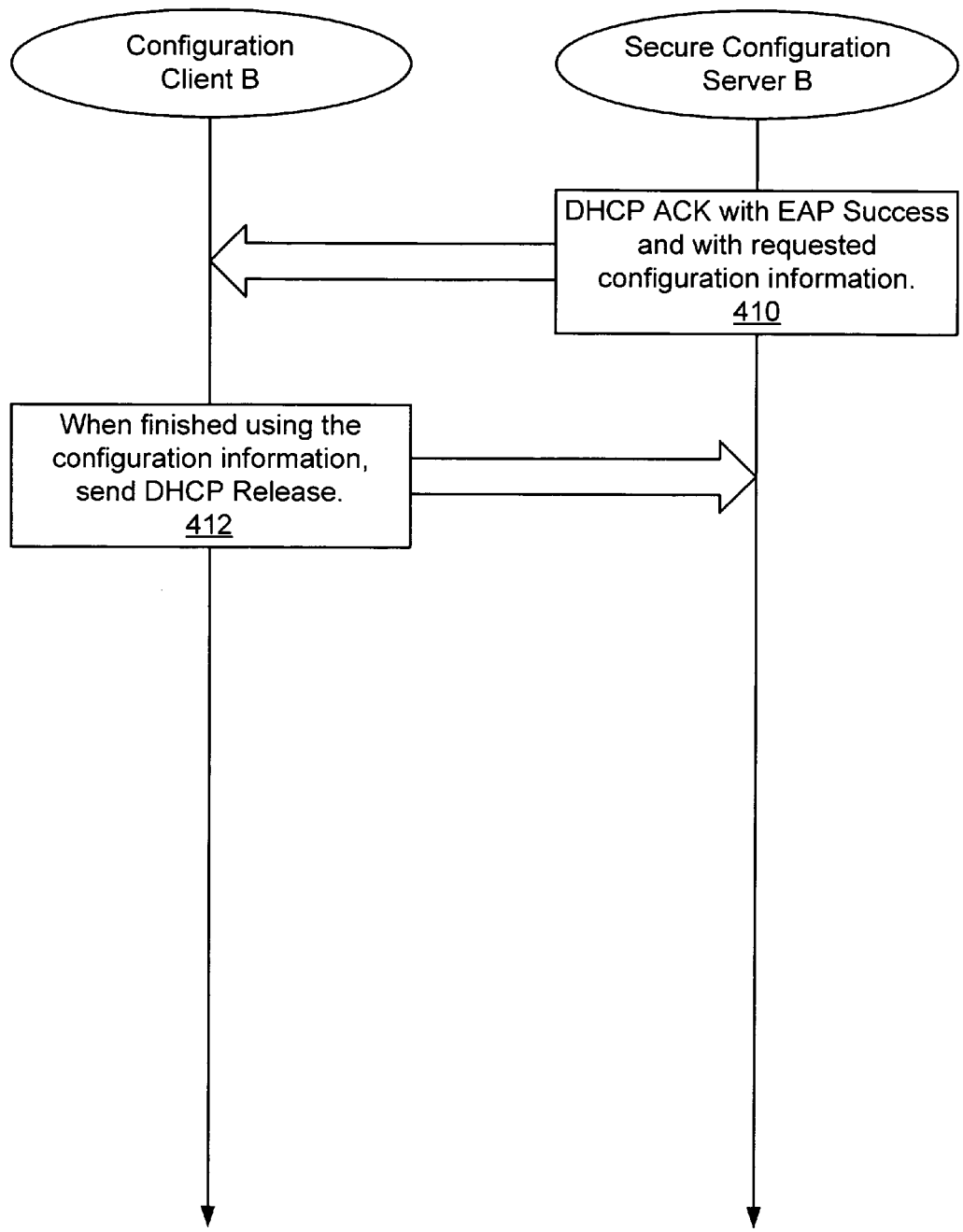

While, in general, either party can initiate the secure configuration process, in step 400 of FIG. 4a the configuration client 106 initiates the process by sending a DHCP Discover message to the secure configuration server 104. This DHCP message contains the configuration client 106's request for configuration information. Carried within the options field of the DHCP Discover message is a notice that the configuration client 106 is prepared to use EAP to authenticate itself. These two protocols, DHCP and EAP, are well known in the art, and so their details need not be discussed here. They are defined, respectively, in the Requests for Comments 2131 and 3748 of the Internet Engineering Task Force, which are incorporated herein in their entireties by reference.

Because the secure configuration server 104 will not provide configuration information to an un-authenticated client, it responds in step 402 with a DHCP Offer message containing within its options field an EAP message requesting the identity of the configuration client 106. The configuration client 106 responds in step 404 by sending an EAP message containing its identity. The EAP message is, once again, contained within the options field of a DHCP message.

EAP allows the configuration client 106 and the secure configuration server 104 to negotiate and to use any of a number of authentication mechanisms. In steps 406 and 408, the two parties proceed through the details of EAP and of the authentication mechanism they have chosen. In some embodiments, EAP need not be altered in any way for the purposes of the present invention, and so the details of EAP known in the art apply as well here. In steps 406 and 408, as in the previous steps of FIG. 4a, EAP messages are carried within the options fields of DHCP messages.

If the authentication process proceeds to a successful conclusion, then the secure configuration server 104 accepts the authenticity of the configuration client 106, and, in step 410 of FIG. 4b, sends an EAP Success message carried in the options field of a DHCP ACK message. That DHCP message also includes the requested configuration information.

When the configuration client 106 has completed its work with the network 100, it relinquishes the configuration information by sending a DHCP Release message in step 412.

Figure 5:
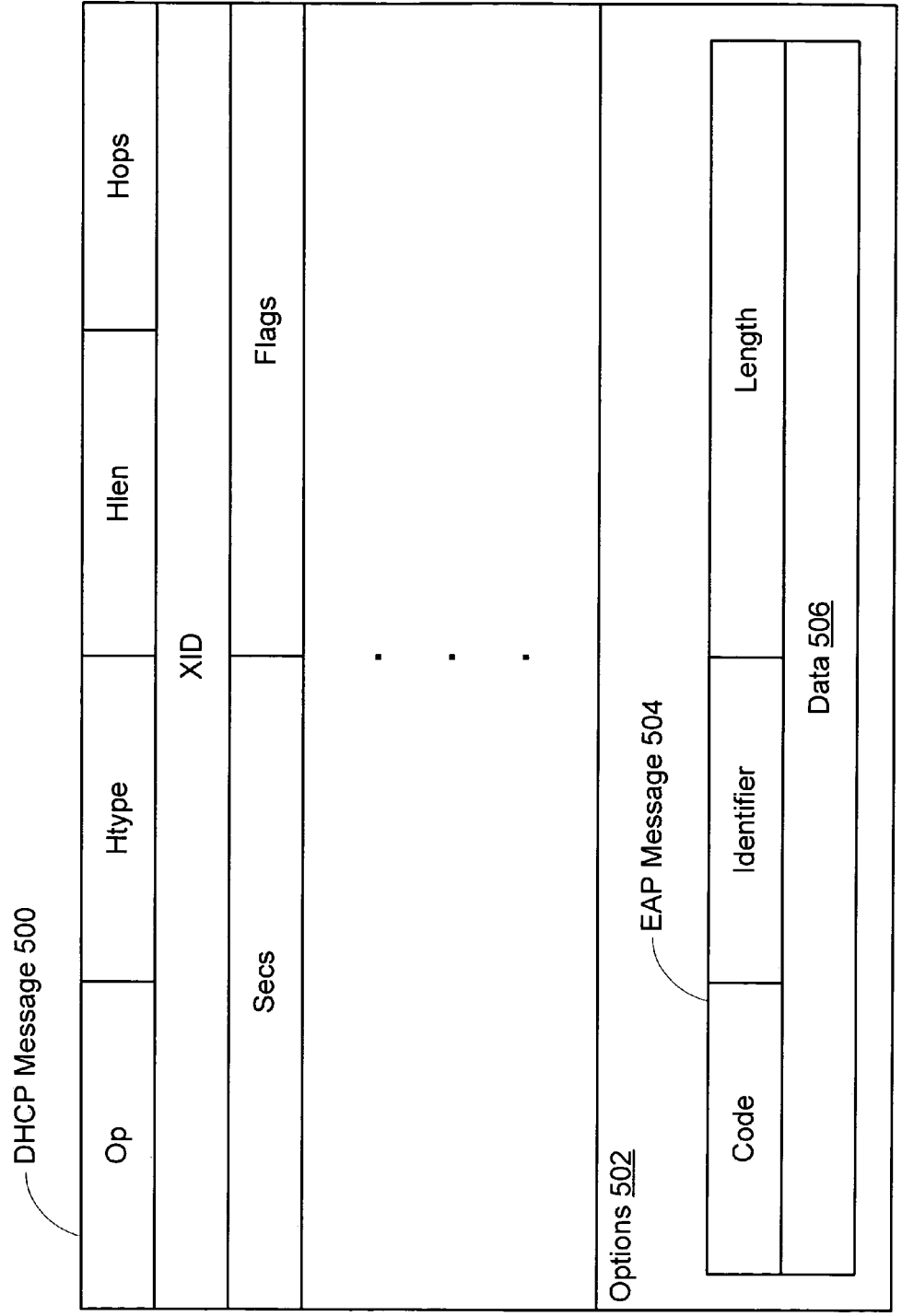
FIG. 5 is a data structure diagram of an EAP message carried within the options field of a DHCP message.

FIG. 5 is an exemplary data structure diagram of a DHCP message 500 containing, within its options field 502, an EAP message 504. The heart of the EAP message is its data field 506. By combining a well known configuration protocol, DHCP, with a well known authentication framework protocol, EAP, embodiments of the present invention provide security to the configuration process without requiring any changes to either protocol.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as configuration and authentication protocols, are determined by specific situations. Although the environment of the invention is described in terms of software modules or components, some processes may be equivalently performed by hardware components. Therefore, the invention as described herein contemplates all such embodiments as may come within the scope of the following claims and equivalents thereof.

We claim:

1. A computer storage medium having computer-executable instructions for performing, in a client/server computing environment, a method for securely providing a client computing device with a network address, the method comprising:

requesting, by the client computing device, a network address;

receiving, by a server computing device, the client's request for a network address;

attempting to authenticate the client computing device to the server computing device;

attempting to authenticate the server computing device to the client computing device; and if the client computing device is authenticated as permitted to receive a network address in the client/server computing environment and if the server computing device is authenticated as permitted to provide a network address in the client/server computing environment, then:

identifying, by the server computing device, a network address that is appropriate to the client/server computing environment and that is not currently assigned to a computing device;

assigning, by the server computing device, the identified network address to the client computing device;

providing, by the server computing device, the assigned network address to the client computing device; and receiving, by the client computing device, the assigned network address.

2. In a client/server computing environment, a method for a server computing device to securely provide a client computing device with a network address, the method comprising:

receiving a client request from a client computing device for a network address;

attempting to authenticate the client computing device to the server computing device;

attempting to authenticate the server computing device to the client computing device; and if the client computing device is authenticated as permitted to receive a network address in the client/server computing environment and if the server computing device is authenticated as permitted to provide a network address in the client/server computing environment, then:

identifying a network address that is appropriate to the client/server computing environment and that is not currently assigned to a computing device;

assigning the identified network address to the client computing device; and providing the assigned network address to the client computing device.

3. The method of claim 2 in which the assigned network address is an IP address.

4. The method of claim 2 in which attempting to authenticate comprises using EAP.

5. The method of claim 4 in which EAP messages are carried in DHCP options fields.

6. The method of claim 2 in which attempting to authenticate is initiated by the server computing device.

7. The method of claim 2 in which identifying a network address is performed even if the client computing device is not authenticated as permitted to receive a network address in the client/server computing environment.

8. The method of claim 2 further comprising: assigning a temporary network address to the client computing device for use during the attempt to authenticate.

9. The method of claim 8 in which, if the client computing device is authenticated as permitted to receive a network address in the client/server computing environment, then the assigned network address is the same as the temporary network address.

10. A computer storage medium having computer-executable instructions for performing, in a client/server computing environment, a method for a client computing device to secure a network address, the method comprising:
   requesting a network address;
   attempting to authenticate the client computing device to a server computing device;
   attempting to authenticate the server computing device to the client computing device; and
   if the client computing device is authenticated as permitted to receive a network address in the client/server computing environment and if the server computing device is authenticated as permitted to provide a network address in the client/server computing environment, then receiving an assigned network address, wherein:
      the assigned network address has been identified by the server computing device as a network address that is appropriate to the client/server computing environment and that is not currently assigned to a computing device;
      the assigned network address has been assigned to the client computing device by the server computer device; and
      the assigned network address has been provided to the client computing device by the server computing device.

11. A system for securely providing, in a client/server computing environment, a client computing device with a network address, the system comprising:
   the client computing device configured for requesting a network address, for attempting to authenticate the client computing device to a server computing device, for attempting to authenticate the server computing device to the client computing device, and, if the client computing device is authenticated as permitted to receive a network address in the client/server computing environment and if the server computing device is authenticated as permitted to provide a network address in the client/server computing environment, then for receiving an assigned network address; and
   the server computing device configured for receiving the client's request for a network address, for attempting to authenticate the client computing device to the server computing device, for attempting to authenticate the server computing device to the client computing device, and, if the client computing device is authenticated as permitted to receive a network address in the client/server computing environment and if the server computing device is authenticated as permitted to provide a network address in the client/server computing environment, then for identifying a network address that is appropriate to the client/server computing environment and that is not currently assigned to a computing device, for assigning the identified network address to the client computing device, and for providing the assigned network address to the client computing device.

12. The system of claim 11 in which the assigned network address is on IP address.

* * * * *